(12) United States Patent
Yoshimoto

(10) Patent No.: US 6,237,023 B1
(45) Date of Patent: May 22, 2001

(54) SYSTEM FOR CONTROLLING THE AUTHORITY OF A TERMINAL CAPABLE OF SIMULTANEOUSLY OPERATING A PLURALITY OF CLIENT SOFTWARES WHICH TRANSMIT SERVICE REQUESTS

(75) Inventor: Masahiko Yoshimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/873,104

(22) Filed: Jun. 11, 1997

(30) Foreign Application Priority Data

Jun. 14, 1996 (JP) .................................................. 8-154118

(51) Int. Cl.$^7$ ...................................................... G06F 15/16
(52) U.S. Cl. ........................ 709/203; 709/201; 713/200; 713/201; 713/202
(58) Field of Search ............................. 395/186, 187.01, 395/200.25, 188.01, 210.3, 200.57; 370/427, 446; 380/23, 25; 713/200, 201, 202; 709/203, 201

(56) References Cited

U.S. PATENT DOCUMENTS

| | | | |
|---|---|---|---|
| 4,672,572 | 6/1987 | Alsberg | 364/900 |
| 4,891,838 | 1/1990 | Faber | 380/25 |
| 4,896,319 | * 1/1990 | Lidinsky et al. | 370/427 |
| 4,916,738 | 4/1990 | Chandra et al. | 380/25 |
| 5,261,070 | 11/1993 | Ohta | 395/425 |
| 5,278,904 | * 1/1994 | Servi | 380/23 |
| 5,590,199 | * 12/1996 | Krajewski et al. | 380/25 |
| 5,706,427 | * 1/1998 | Tabuki | 395/200.57 |
| 5,815,664 | * 9/1998 | Asano | 395/200.57 |
| 5,841,970 | * 11/1998 | Tabuki | 713/201 |

FOREIGN PATENT DOCUMENTS

0604911 A2   12/1993   (EP) .

OTHER PUBLICATIONS

Tanenbaum, A.S. et al. "The Amoeba distributed operating system—a status report", Computer Communications 14 (1991) Jul./Aug., No. 6, London,GB.

* cited by examiner

Primary Examiner—Meng-Al T. An
Assistant Examiner—Nabil El-Hady
(74) Attorney, Agent, or Firm—Fitzpatrick, Cella, Harper & Scinto

(57) ABSTRACT

When a server receives a service request from a client, identifiers of a terminal and of a user are acquired from the service request and authority with respect to the service request is uniquely decided from the terminal and user identifiers acquired. It is then determined, using the authority decided, whether or not to accept the service request.

84 Claims, 6 Drawing Sheets

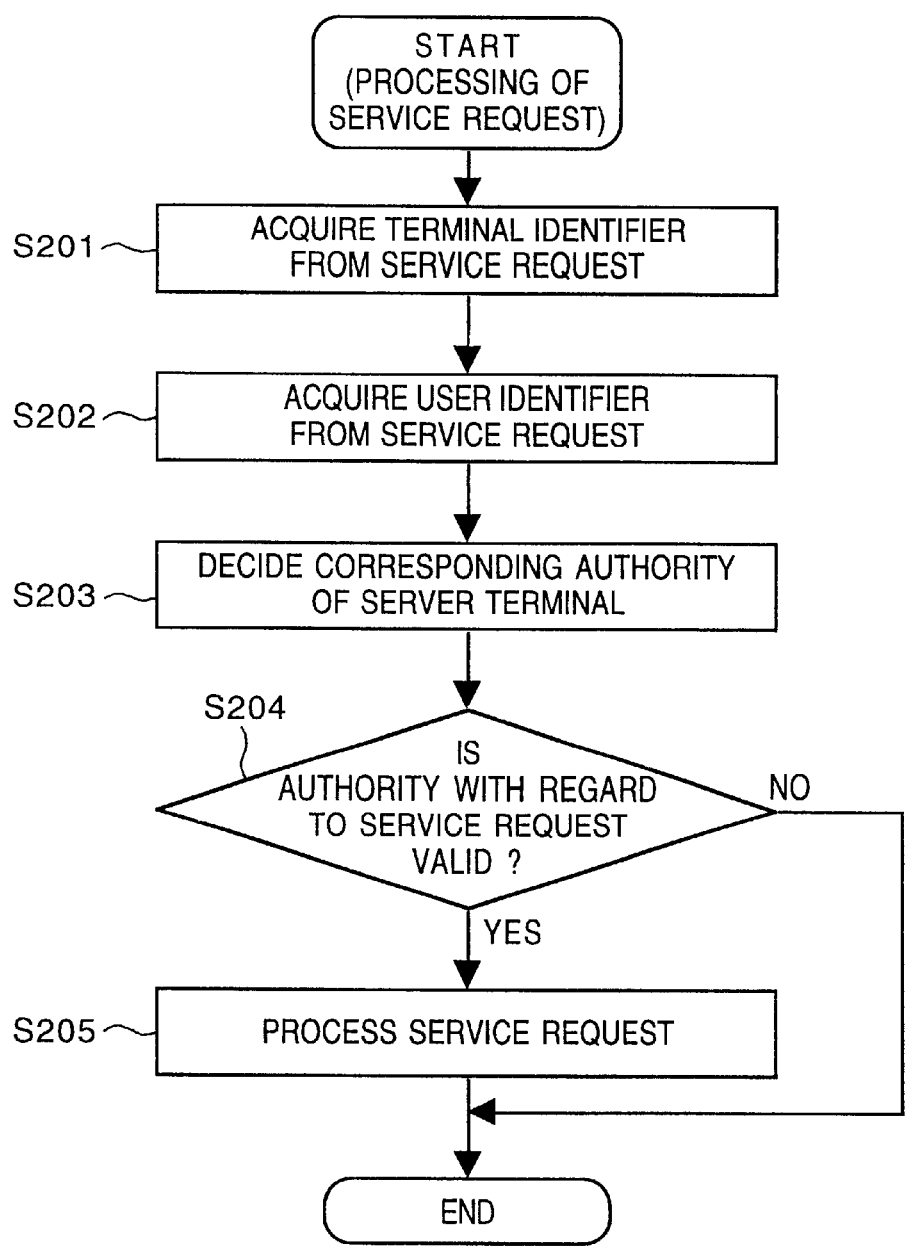

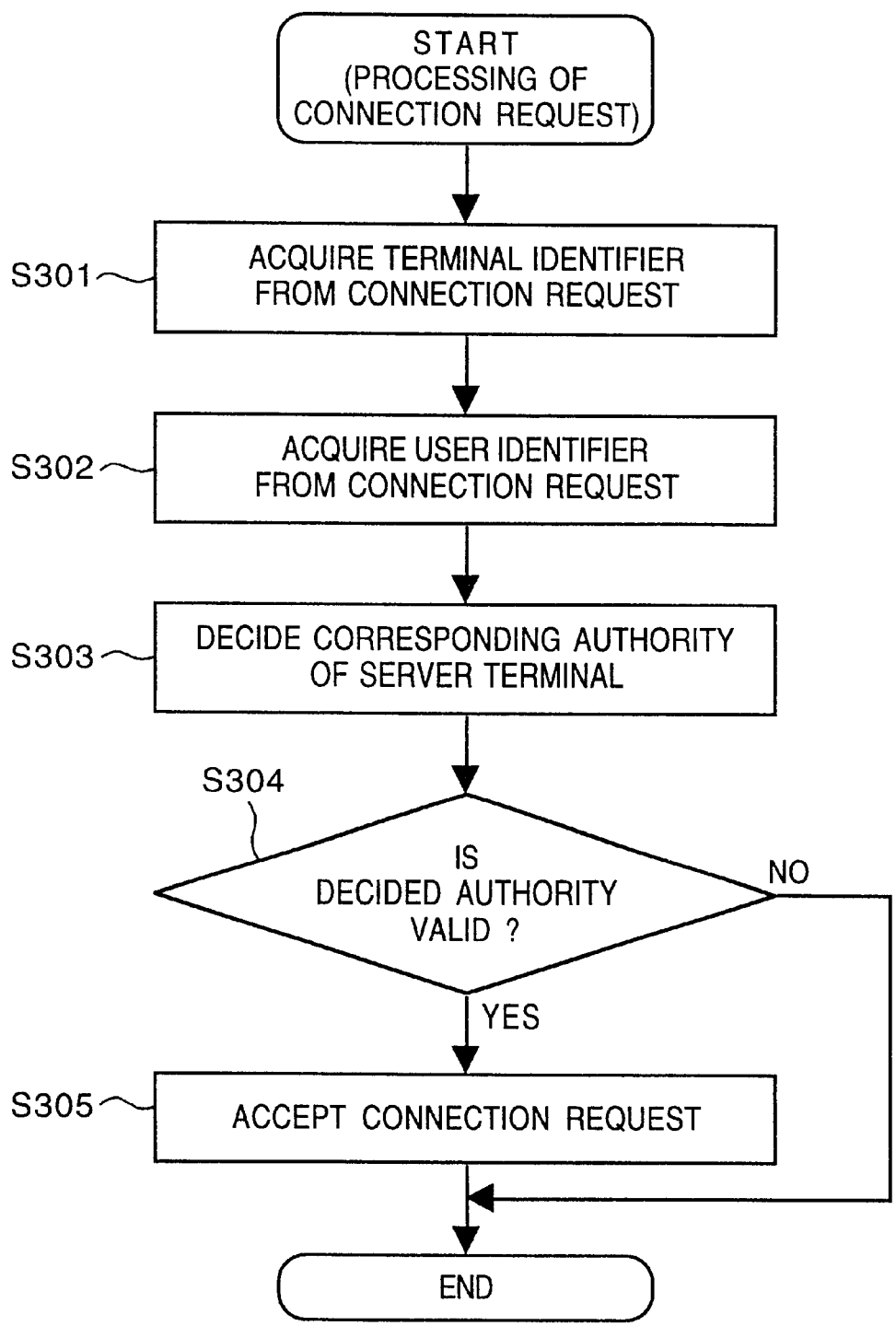

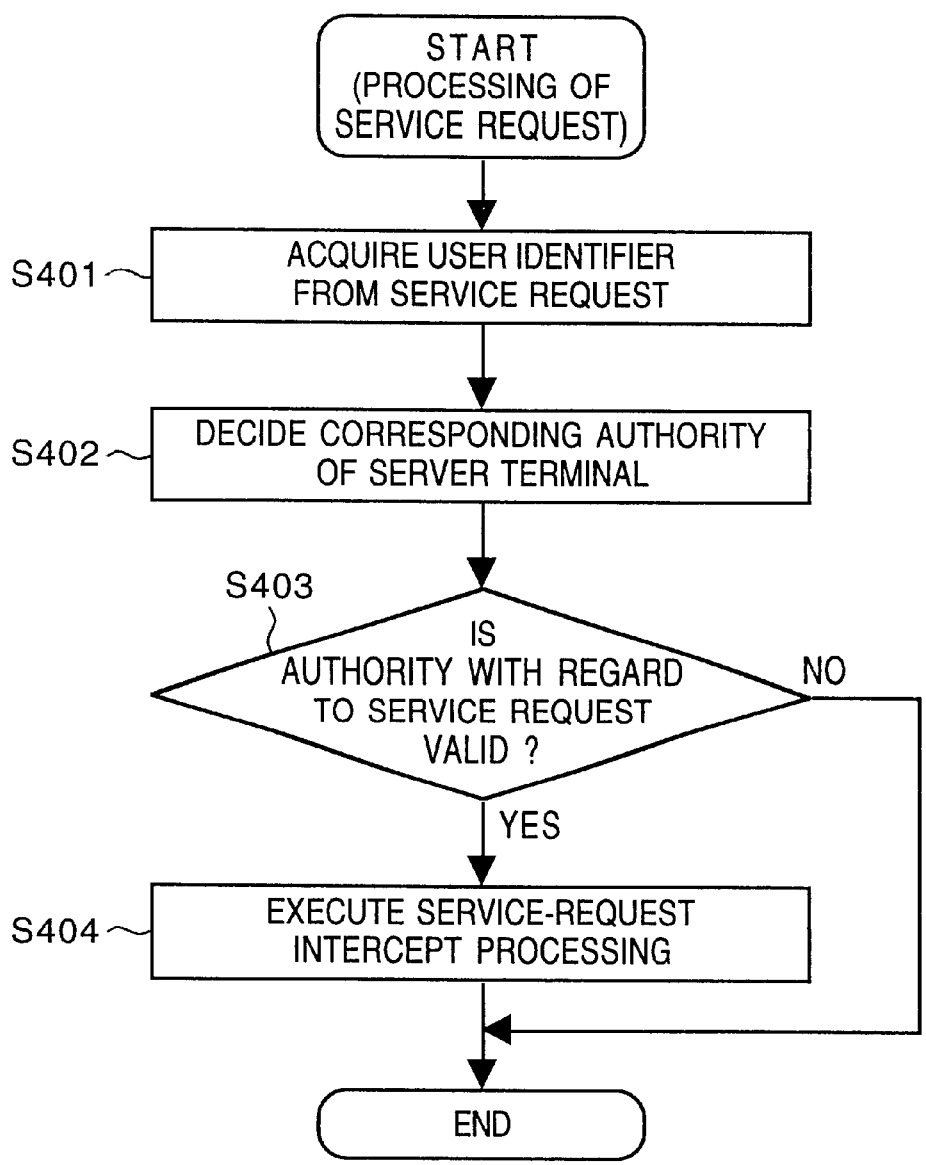

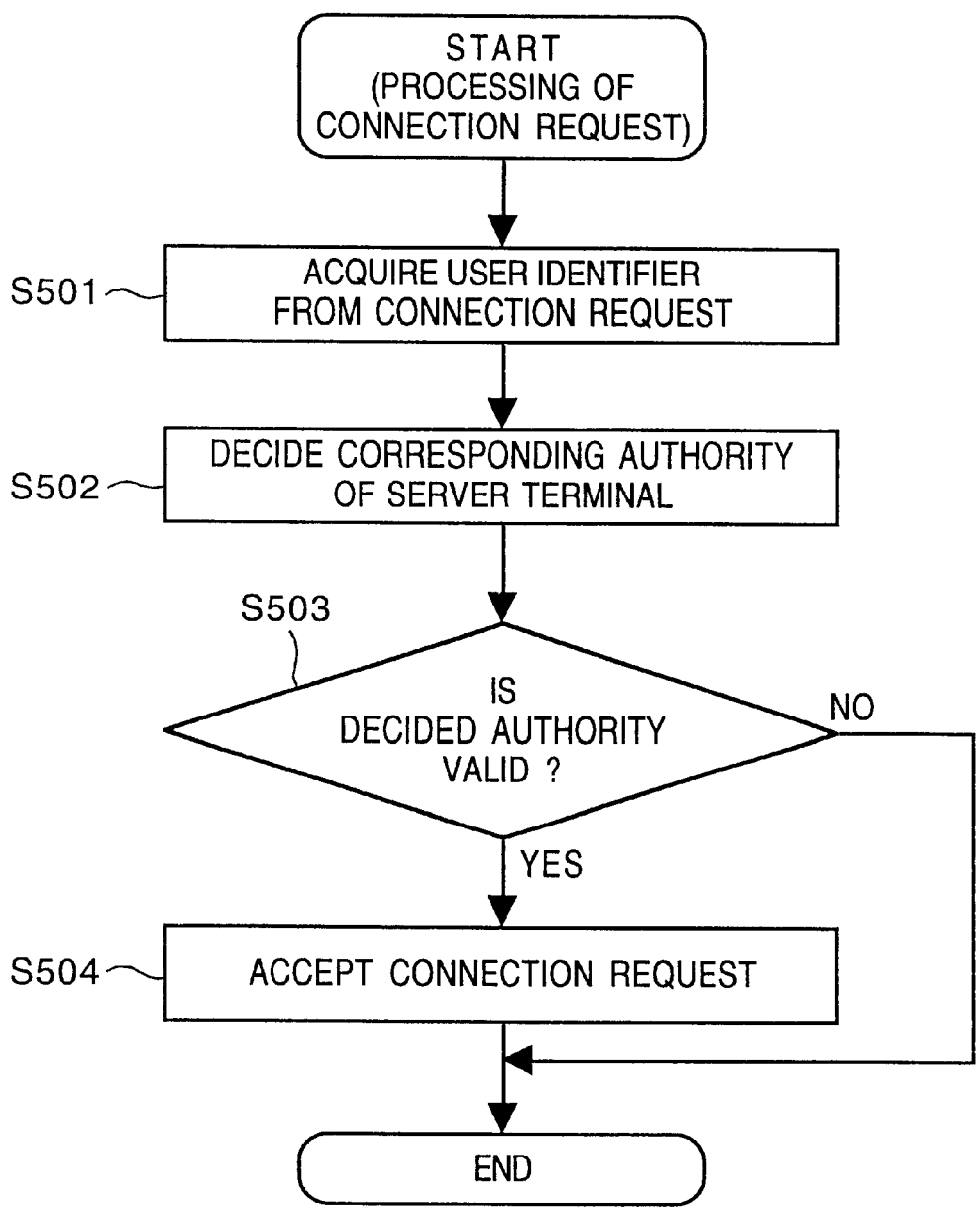

FIG. 6

| DIRECTORY INFORMATION |
| --- |
| ⋮ |
| ⋮ |
| SERVICE-REQUEST RECEPTION MODULE |
| IDENTIFIER ACQUISITION MODULE |
| AUTHORITY DECISION MODULE |
| SERVICE-REQUEST VALIDITY JUDGMENT MODULE |
| SERVICE-REQUEST PROCESSING MODULE |
| ⋮ |
| ⋮ |
| ⋮ |
| |
| |

FIG. 7

| DIRECTORY INFORMATION |
| --- |
| ⋮ |
| IDENTIFIER ACQUISITION MODULE |
| IDENTIFIER ADD-ON MODULE |
| SERVICE-REQUEST TRANSMISSION MODULE |
| RECEIVED-MESSAGE DISTRIBUTION MODULE |
| ⋮ |
| SERVICE-REQUEST RECEPTION MODULE |
| IDENTIFIER ACQUISITION MODULE |
| AUTHORITY DECISION MODULE |
| SERVICE-REQUEST VALIDITY JUDGMENT MODULE |
| SERVICE-REQUEST PROCESSING MODULE |
| ⋮ |
| ⋮ |

SYSTEM FOR CONTROLLING THE AUTHORITY OF A TERMINAL CAPABLE OF SIMULTANEOUSLY OPERATING A PLURALITY OF CLIENT SOFTWARES WHICH TRANSMIT SERVICE REQUESTS

BACKGROUND OF THE INVENTION

This invention relates to an access control system and method, particular access control of a distributed system in which the resources of remote sites are shared using a computer network, by way of example.

Access control in a distributed system generally is achieved by combining an authentication mechanism in the distributed system with a resource protection mechanism at each site. For example, a distributed file system, which is a means of sharing files via a network, is used in a comparatively small-scale network environment such as a local area network (LAN). In such case user authentication means at the site level is appropriated in the network environment as well by unifying modes of user management, and resource protection is achieved based upon the authority granted to authenticated users. The file access control means for implementing this generally is provided by the operating system (OS).

In a comparatively large-scale network such as a wide-area network (WAN), on the other hand, use is made of authentication by an authentication system because unifying modes of user management is difficult. In a large-scale network environment, opportunities to share resources per se are fewer than in a small-scale network. However, in terms of providing the mechanism eventually used as the resource protection mechanism, the situation is the same as in the case of the small-scale network environment.

However, the following problems arise in the art described above:

The first problem is that satisfactory reliability cannot be assured merely by applying the site-level user authentication mechanism to a distributed system. Even if modes of user management are unified between sites, no legal force is involved and a certain site is capable of individually altering some of the management information. In cases such as these, it is possible for a site administrator to impersonate a user and it is difficult for the resource provider to detect this.

The second problem is that in a scenario in which the resource protection mechanism provided by the operating system (OS) is applied to distributed resources, ordinarily this is effective only at the site at which the resource protection mechanism is operating. Consequently, if there is an externally applied request for operation of a resource, the request must be dealt with based upon the rightful authority given to the site. However, as long as users once authenticated possess the same authority, it is not possible to cope with a situation in which reliability or level of authorization differ depending upon the site, even for the same user.

SUMMARY OF THE INVENTION

Accordingly, an object of the present invention is to provide an access control system and method in which, when shared resources in a distributed system are accessed, the shared resources can be protected safely and flexibly.

According to the present invention, the foregoing object is attained by providing an access control system for controlling access to a distributed system in which resources of remote sites are shared using a computer network, comprising acquisition means for acquiring an identifier of a terminal-which requests a service and an identifier of a user, decision means for uniquely deciding authority over the service request based upon the terminal identifier and user identifier that have been acquired, and judging means for judging, using the authority that has been decided, whether or not to accept the service request.

In another aspect of the invention, the foregoing object is attained by providing an access control system for controlling access to a distributed system in which resources of remote sites are shared using a computer network, comprising relay means for acquiring an identifier of a user requesting a service, intercepting the service request by transmitting, to a prescribed address, a service request message onto which the acquired user identifier has been added, and distributing a received message, and service providing means for acquiring as a user identifier an identifier added onto the received service request message, acquiring as a terminal identifier an identifier of the relay means that transmitted this service request message, uniquely deciding authority over the service request based upon the terminal identifier and user identifier that have been acquired, and judging, using the authority that has been decided, whether or not to accept the service request.

According to the present invention, the foregoing object is attained by providing an access control method for controlling access to a distributed system in which resources of remote sites are shared using a computer network, comprising an acquisition step of acquiring an identifier of a terminal which requests a service and an identifier of a user, a decision step of uniquely deciding authority over the service request based upon the terminal identifier and user identifier that have been acquired, and a judging step of judging, using the authority that has been decided, whether or not to accept the service request.

In another aspect of the invention, the foregoing object is attained by providing an access control method for controlling access to a distributed system in which resources of remote sites are shared using a computer network, comprising, in relay means for intercepting a service request and distributing a received message, a first acquisition step of acquiring an identifier of a user requesting a service and a transmission step of transmitting, to service providing means, a service request message to which the acquired user identifier has been added on, and, in the service providing means, a receiving step of receiving a service request message, a second acquisition step of acquiring as a user identifier the identifier added onto the received service request message, and acquiring is a terminal identifier an identifier of the relay means that transmitted this service request message, a decision step of uniquely deciding authority over the service request based upon the terminal identifier and user identifier that have been acquired, and a judging step of judging, using the authority that has been decided, whether or not to accept the service request.

In accordance with the present invention having the configuration described above, it is possible to provide an access control system and method in which, when shared resources in a distributed system are accessed, the shared resources can be protected safely and flexibly.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles thereof.

FIG. 2 is a flowchart showing an example of a procedure through which a server processes a service request from a client;

FIG. 3 is a flowchart showing an example of a procedure through which a server processes a connection request from a client;

FIG. 4 is a flowchart showing an example of a procedure through which a relay server processes a service request from a client;

FIG. 5 is a flowchart showing an example of a procedure through which a relay server processes a connection request from a client;

FIG. 6 is a diagram showing a first example of a storage medium storing program codes according to the present invention; and FIG. 7 is a diagram showing a second example of a storage medium storing program codes according to the present invention.

DESCRIPTION OF THE PREFERRED EMBODIMENTS

Figure 1:
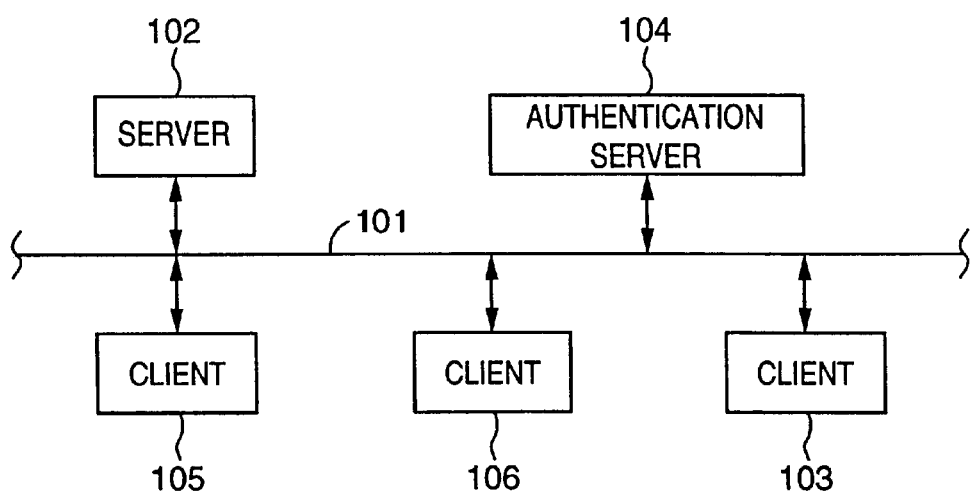
FIG. 1 is a diagram illustrating an example of the configuration of a network environment according to an embodiment of the present invention.

An access control system according to embodiments of the present invention will be described in detail with reference to the drawings.

The embodiments described below relate to a distributed system having a plurality of users, particularly a distributed system in which the authorities of individual users are managed uniformly even in a distributed environment in which the modes of user management differ from one site to another.

[First Embodiment]

FIG. 1 is a diagram illustrating an example of the configuration of a network environment according to an embodiment of the present invention.

As shown in FIG. 1, a group of terminals, described later, are connected to a network cable 101 to construct a computer network. The computer network described here includes an Ethernet, a LAN using an FDDI, a WAN constructed by interconnecting networks by a public telephone line or leased line, etc.

A server terminal 102 is a computer system such as a work station or personal computer run by an application provided in a distributed system. Client terminals 103, 105, 106 are computer systems, which are similar to the server terminal 102, run by applications utilizing resources in the distributed system. An authentication server terminal 104 is a computer system, which is similar to the server terminal 102, run by an authentication server which provides an authentication mechanism in the network environment. The authentication server terminal 104 is provided by a Kerberos system, by way of example.

These computer systems are assigned their own identifiers, which are acquired by communication between any of the terminals. Further, the above-mentioned server application, client applications and authentication server are items of software stored on an external storage medium such as a floppy disk, a hard disk, a magneto-optic drive (MO), a CD-ROM, a CD-R or a magnetic tape, or in any non-volatile semiconductor memory device such as a ROM or flash memory. When necessary the particular software is read in the memory possessed by the terminal and is then executed by a CPU with which the same terminal is provided. It is unnecessary to assign a dedicated terminal to the application software executed, and servers, clients, etc. may operate a certain terminal simultaneously. Further, the term "server" or "client" is a generic term that relates to the role of the application concerning a prescribed service and does not necessarily have a fixed meaning in terms of an application. In actuality, a certain application may be a server with regard to a certain service or a client with regard to a different service.

FIG. 2 is a flowchart showing an example of a procedure through which a server processes a request from a client. The flowchart has a first step S201, at which a terminal identifier is acquired from a service request sent from a client. The user identifier is then acquired from the service request at step S202. Here the processing for acquiring the user identifier employs authentication means supplied by the authentication server. However, an arrangement may be adopted in which the identifier is acquired using means supplied in dependence upon the network environment, e.g. identity inquiry means in conformity with FRC1413 in the TCP/IP (Transmission Control/Internet Protocol) network environment.

Next, at step S203, the corresponding authority of the server terminal is decided based upon the terminal identifier and user identifier acquired. If the requested service is to gain access to resources (e.g. files, devices, etc.) protected by the OS, the authority of the server terminal is an authority defined by the OS. If the requested service is a resource (e.g. shared data in a database management system) protected by the server, then the authority of the server terminal is an authority defined independently by the server.

This is followed by step S204, at which it is determined whether the authority regarding the service request is valid (whether the service request is within the limits of authority). If the authority is valid, then the service request is processed at step S205. Of course, if the authority regarding the service request is invalid (the service request is outside the limits of authority), then the service request is not processed.

The details of processing at steps S203 and S204 will now be described.

If a subset of a quotient lattice decided by a certain equivalence relation is taken in a direct product lattice of a set lattice corresponding to respective ones of the terminal identifiers and user identifiers, an ordered relation in the quotient lattice will hold in this subset. A set M comprising all maximal elements is decided in relation to the ordered relation. On the other hand, take an element r of quotient lattices corresponding to the terminal identifier and user identifier obtained at steps S201 and S202. When there is one for which m ⊃ r holds, where m is the element of M, the authority with regard to the request is taken as being valid.

In other words, it is assumed that the above-mentioned equivalence relation, the set of maximal elements and a unique corresponding relationship from the maximal elements to the authority of the server terminal have been obtained in advance with regard to each service. Then, at step S203, a equivalence class with regard to the terminal identifier and user identifier is decided. It is then determined at step S204 whether there is an ordered relation between this equivalence class and a series of maximal elements.

Since all sets in the foregoing are equivalence sets, they are expressed by well-known means, such as a bit string. The equivalence relation, on the other hand, is means for converting the bit string to another, shorter bit string in accordance with rules given by declaration or procedurally.

Abnormalities due to a variety of faults can occur at steps S201 and S202. In such case the element of the quotient lattice corresponding to the least upper bound of the direct product lattice relating to the terminal identifier is substituted as the equivalence class at step S203 in response to an abnormality at step S201. The element of the quotient lattice corresponding to the least upper bound of the direct product lattice relating to the user identifier is substituted in response to an abnormality at step S202. The least upper bound of the quotient lattice is substituted in response to abnormalities at both steps S201 and S202.

By way of example, in a case where a service provided to a user group composed of prescribed users is restricted at a terminal connected to a prescribed network, the following is given as an equivalence relation: "whether or not the terminal is included in a sublattice of a direct product lattice decided by a set of identifiers of terminals connected to a specified network and a set of identifiers of users belonging to a specified user group". In other words, the pair "whether or not the terminal is connected to a specified network" and "whether or not the terminal belongs to a specified user group" is given as the equivalence relation.

As a result, the set of terminal identifiers and the set of user identifiers are each split into two sublattices that do not overlap each other, whereupon there is obtained a quotient lattice of a direct product set comprising 16 elements. This quotient lattice clearly is isomorphic to the direct product lattice of the quotient lattice relating to respective ones of the terminal identifier and user identifier. Accordingly, only one equivalence class corresponding to all pairs of terminal identifiers and user identifiers which will accept a service request is decided in the above-mentioned quotient lattice. This equivalence class is made to correspond to the authority over a service by deciding a set of maximal elements in which this equivalence class is adopted as one element. By virtue of the foregoing operation, the equivalence relation and the set of maximal elements regarding a service, as well as the corresponding relationship to the authority, are specified. In this setting, the pair of terminal identifiers and user identifiers obtained from the service request of the client corresponds to some equivalence class of the quotient lattice. However, acceptance of the request is limited to a case corresponding to an equivalence class employed as a maximal element.

More specifically, in accordance with this embodiment, since an equivalence relation in a set naturally corresponds to an equivalence relation in a set lattice, performing grouping with regard to terminals or users is nothing more than shrinking a large set lattice of elements to a small quotient lattice. As a result, a quotient lattice possessing universality with respect to all quotient lattices used by a server exists, and any quotient lattice becomes a quotient lattice obtained by deciding a separate equivalence relation with respect to the quotient lattice possessing universality. The maximal elements decided by the above-mentioned example in which there is a limitation upon services provided to a specified user group at a terminal connected to a specified network correspond to a sublattice of the universal quotient lattice. Accordingly, this is equivalent to effects obtained in a case where, instead of making the setting in the above-mentioned example, use is made of an equivalence relation which determines a quotient lattice having universality and a set of maximal elements comprising the least upper bounds of the sublattice of the quotient lattice.

Thus, in accordance with this embodiment, objects which determine whether authority is given or not can be aggregated in arbitrary units. This makes it possible to establish access control in highly flexible fashion.

Furthermore, in accordance with embodiments described below, it will be illustrated that the present invention is effective also in regard to supporting a distributed environment in which user management modes are different. More specifically, if all pairs of terminal identifiers and user identifiers regarding one and the same user are regarded as being one equivalent, and if this is performed with respect to all users, then one equivalence relation will be obtained. The element of the quotient lattice obtained by this equivalence relation is decided, with regard to individual users, without relation to differences in the user management modes. Accordingly, the set of maximal elements may be decided regarding the quotient lattice as being a universal quotient lattice, and a simpler quotient lattice may be decided using a separate equivalence relation. Further, in order to inhibit illegitimate access from a terminal having poor security, it is also possible to adopt an arrangement in which the equivalence class regarding one and the same user is divided into two parts in conformity with the level of security, and weak authority is given to the equivalence class having the lower level.

[Second Embodiment]

An access control system according to a second embodiment of the present invention will now be described. In the second embodiment, elements substantially the same as those of the first embodiment are designated by like reference characters and need not be described again.

The procedure shown in FIG. 2 makes it possible, even for one and the same user, to arbitrarily set the level of authority in dependence upon the terminal utilized by this user. However, the above-mentioned procedure is such that authentication processing regarding a user is executed with regard to all service requests, and problems in terms of efficiency arise in a case where a service request is issued repeatedly. Accordingly, in the second embodiment, from the standpoint that it will suffice to assure security below a so-called transport level, authentication processing is executed when the connection of a transport level is set.

FIG. 3 is a flowchart showing an example of a processing procedure executed when establishing the connection of a transport level.

At steps S301 through S303, a terminal identifier and a user identifier are acquired from a connection request and the corresponding authority in terms of the server terminal is decided. This is similar to the processing of steps S201 and S203 shown in FIG. 2. It is determined at step S304 whether the decided authority is valid at the server. If the authority is valid, then the connection request is accepted at step S305. Of course, if the authority that has been decided is not valid at the server, then the connection request is not accepted.

The processing procedure for a service request in a case where a connection request is processed in accordance with the procedure shown in FIG. 3 is modified to exclude the steps from S201 to S203 from the procedure of FIG. 2 and, in their place, retrieve the authority decided at step S303 from the service request. This modification of the procedure is easy to perform. Specifically, it will suffice to record a pair consisting of a connection identifier and the authority and retrieve the authority from the connection identifier at step S305 when the service request is processed. It should be noted that the pair consisting of the connection identifier and the authority is destroyed autonomously at the server when the connection is broken.

The processing of steps S303 and S304 is similar to the processing of steps S203 and S204 shown in FIG. 2. However, rather than using settings relating to services, use is made of settings relating to a connection, namely an equivalence relation, a set of maximal elements and a unique corresponding relationship from the maximal elements to the authority of the server terminal. As for the settings relating to a connection and the settings relating to a series of services, usually whatever satisfies the criteria in the former is selected so as to satisfy the criteria in the latter, although in general the two may be independent of each other.

[Third Embodiment]

An access control system according to a third embodiment of the present invention will now be described. In the third embodiment, elements substantially the same as those of the first embodiment are designated by like reference characters and need not be described again.

In a distributed system of a certain type, a certain type of server (referred to below as a "relay server") is provided. Specifically, service requests issued by a plurality of clients simultaneously at client stations are sent to a server collectively by the relay server and messages sent from a server are distributed to the clients by the relay server. Such a configuration is very effective in a case where replicas of shared resources are held at the client terminals and in a case where messages from the server are sent to a series of clients in the manner of a broadcast. In a configuration of this kind, it is possible to simplify the procedure shown in FIG. 2 or FIG. 3, as will be described below.

First, processing for confirming authority is performed between a server and a relay server in accordance with the procedure shown in FIG. 2 or FIG. 3. The reason for this is that a service which a server provides directly to a relay server differs from that provided to a client; the relay server provides a mechanism for intercepting a request from the client. Accordingly, steps S203 and S204 shown in FIG. 2 are executed based upon setting relating to the service. Step S205, rather than being a step for processing a service request, is a step for processing a service intercept request. It should be noted that the service intercept request processing per se is executed in accordance with the procedure from step S203 onward in the first embodiment using a user identifier and terminal identifier of the relay server obtained through the procedure described below.

FIG. 4 is a flowchart illustrating an example of a procedure, which corresponds to FIG. 2, which a relay server executes with respect to each client in a distributed system of the kind set forth above.

The flowchart has a first step S401, at which a user identifier is acquired from a service request. Since a relay server and a client are operating one and the same terminal, the processing for acquiring the user identifier is capable of being executed securely and efficiently without using an authentication server or the like.

Next, in a case where various settings relating to a series of services have been provided by a server, authority is decided at step S402 and the validity thereof with respect to the service request is discriminated at step S403. Steps S402 and S403 are for suppressing needless relaying of service requests. Though it is preferred that this actually be carried out, it is possible for this to be omitted.

Finally, service-request intercept processing is executed at step S404. This processing involves transferring, to the server, a message obtained by adding the user identifier acquired at step S401 onto the request message of the client. The user identifier added on is nothing more than a user identifier necessary in service-request intercept processing at the relay server.

FIG. 5 is a flowchart illustrating an example of a procedure, which corresponds to FIG. 3, which a relay server executes with respect to each client.

Step S501 in FIG. 5 is for acquiring a user identifier from a connection request in the same manner as at step S401 in FIG. 4.

Next, in a case where various settings relating to a connection request have been provided by a server, authority is decided at step S502 and the validity of the decided authority is discriminated at step S503. Steps S502 and S503 are for suppressing needless relaying of connection requests. Though it is preferred that this actually be carried out, it is possible for this to be omitted.

Finally, at step S504, the connection request is accepted and the pair consisting of the connection identifier and user identifier received is recorded.

Thereafter, the relay server subjects the accepted connection to processing for intercepting a service request from a client. This intercept processing involves transferring, to the server, a message obtained by adding the user identifier recorded at step S504 onto the request message of the client. It should be noted that the pair consisting of the recorded connection identifier and user identifier is destroyed autonomously at the relay server when the connection is broken.

[Fourth Embodiment]

An access control system according to a fourth embodiment of the present invention will now be described. In the fourth embodiment, elements substantially the same as those of the first embodiment are designated by like reference characters and need not be described again.

In the third embodiment, authentication of the relay server by a third party such as an authentication server may be omitted in a case where the security of the terminal being operated by the relay server is assured and the relay server is a privileged process in the OS at this terminal. For example, in a TCP/IP network environment, privilege is necessary in an address setting based upon a port number of No. 1023 or less, depending upon the OS of the terminal.

In accordance with this embodiment, the relay server performs the address setting based upon a privileged port number, and the server verifies whether this address is one that has been set by the relay server, thereby making possible identity inquiry of the relay server without relying upon third-party authentication means. Here simple verification means will suffice, such as means for performing regression transfer of any bit pattern selected randomly by communication using the above-mentioned privileged port. The reason for this is that as long as the security of the terminal is assured, an unlawful privileged process which sends back the bit pattern cannot exist. Of course, such means are hazardous in a WAN environment because the reliability of intervening signal paths cannot in general be assured but they are practical in many LAN environments used in offices or the like.

[Other Embodiments]

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program. In this case, the program codes read from the storage medium implement the functions according to the embodiments, and the storage medium storing the program codes constitutes the invention. Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-mentioned storage medium, program codes corresponding to the flowchart described earlier are stored on this storage medium. More specifically, modules illustrated in the example of the memory map of FIG. 6 or FIG. 7 are stored on the storage medium.

Specifically, it will suffice to store program codes of at least modules of "identifier acquisition", "authority decision" and "validity judgment" on the storage medium or to store program codes of least modules of "identifier acquisition A", "identifier add-on" and "transmission" for relay means and program codes of at least "reception", "identifier acquisition B", "authority decision" and "validity judgment" for service providing means.

As many apparently widely different embodiments of the present invention can be made without departing from the spirit and scope thereof, it is to be understood that the invention is not limited to the specific embodiments thereof except as defined in the appended claims.

What is claimed is:

1. An authority control system where a server terminal controls an authority of a terminal capable of simultaneously operating a plurality of client softwares which transmit respective service requests to the server terminal,
said terminal comprising relay means for relaying a service request from each of the client softwares to, the server terminal,
said relay means comprising:
user identifier acquisition means for acquiring an identifier of each user who uses a client software transmitting the service request;
identifier addition means for adding a user identifier, acquired by said user identifier acquisition means, and a terminal identifier, held by said relay means, to the service request;
transmission means for transmitting the service request to the server terminal;
reply reception means for receiving a reply from the server terminal; and
distribution means for distributing the received reply to each of the client softwares which have transmitted the service request, and
said server terminal comprising:
reception means for receiving the service request;
identifier acquisition means for acquiring the user identifier and the terminal identifier from the received service request;
authority decision means for deciding an authority over the service request based on the user identifier and the terminal identifier acquired by said identifier acquisition means;
service determination means for determining whether or not to accept the service request by using the authority decided by said authority decision means; and
reply transmission means for transmitting a reply to said relay means in response to the service request by implementing the service request determined as accepted.

2. The authority control system according to claim 1, said relay means further comprising transmission determination means for determining whether or not to transmit the service request to said server terminal based on the user identifier acquired by said user identifier acquisition means and the service request.

3. The authority control system according to claim 1, wherein when said relay means transmits a service request to be relayed by using a process requiring a privilege, said service determination means makes a determination to accept the service request.

4. The authority control system according to claim 3, wherein the process requiring the privilege is a communication using a port number which cannot be used without the privilege.

5. The authority control system according to claim 4, wherein the process requiring the privilege is a communication using a predetermined port number.

6. An authority control system where a server terminal controls an authority of a terminal capable of simultaneously operating a plurality of client softwares which transmit respective service requests to the server terminal,
said terminal comprising relay means for relaying a connection request and a service request from each of the client softwares to the server terminal,
said relay means comprising:
user identifier acquisition means for acquiring an identifier of each user who uses a client software transmitting the service request, when the connection request is transmitted to the server terminal;
identifier addition means for adding a user identifier, acquired by said user identifier acquisition means, and a terminal identifier, held by said relay means, to the connection request;
connection request transmission means for transmitting the connection request to the server terminal;
service request transmission means for transmitting the service request after establishing the connection;
reply reception means for receiving a reply from the server terminal; and
distribution means for distributing the received reply to each of the client softwares which have transmitted the service request, and
said server terminal comprising:
reception means for receiving the connection request and the service request;
identifier acquisition means for acquiring the user identifier and the terminal identifier from the received connection request;
connection determination means for determining whether or not to accept the connection request based on the user identifier and the terminal identifier acquired by said identifier acquisition means;
authority decision means for deciding an authority over the service request based on the user identifier and the terminal identifier acquired by said identifier acquisition means, if said connection determination means makes a determination to accept the connection request;

service determination means for determining whether or not to accept the service request while the connection is established, by using the authority decided by said authority decision means; and reply transmission means for transmitting a reply to said relay means in response to the service request by implementing the service request determined as accepted.

7. The authority control system according to claim 6, said relay means further comprising transmission determination means for determining whether or not to transmit the connection request to said server terminal based on the user identifier acquired by said user identifier acquisition means and the connection request.

8. The authority control system according to claim 6, wherein when said relay means transmits a connection request to be relayed by using a process requiring a privilege, said connection determination means makes a determination to accept the connection request.

9. The authority control system according to claim 8, wherein the process requiring the privilege is a communication using a port number which cannot be used without the privilege.

10. The authority control system according to claim 9, wherein the process requiring the privilege is a communication using a predetermined port number.

11. A terminal capable of simultaneously operating a plurality of client softwares which transmit respective service requests to a server terminal, wherein the server terminal decides an authority of the terminal over the service request based on a user identifier and a terminal identifier, determines whether or not to accept the service request by using the decided authority, and transmits a reply to the terminal in response to the service request by implementing the service request determined as accepted, said terminal comprising:

relay means for relaying a service request from each of the client softwares to the server terminal, said relay means comprising:

user identifier acquisition means for acquiring an identifier of each user who uses a client software transmitting the service request;

identifier addition means for adding a user identifier, acquired by said user identifier acquisition means, and a terminal identifier, held by said relay means, to the service request;

transmission means for transmitting the service request to the server terminal;

reply reception means for receiving the reply from the server terminal; and distribution means for distributing the received reply to each of the client softwares which have transmitted the service request.

12. The terminal according to claim 11, said relay means further comprising transmission determination means for determining whether or not to transmit the service request to said server terminal based on the user identifier acquired by said user identifier acquisition means and the service request.

13. The terminal according to claim 11, wherein said relay means can transmit a service request to be relayed by using a process requiring a privilege.

14. The terminal according to claim 13, wherein the process requiring the privilege is a communication using a port number which cannot be used without the privilege.

15. The terminal according to claim 14, wherein the process requiring the privilege is a communication using a predetermined port number.

16. A server terminal providing a service to a terminal capable of simultaneously operating a plurality of client softwares which transmit respective service requests, the terminal having relay means which acquires an identifier of each user using the client software transmitting the service request, adds the acquired user identifier and a terminal identifier held by said relay means to the service request, and transmits the service request to the server terminal, the server terminal, comprising:

reception means for receiving a service request;

identifier acquisition means for acquiring, from the received service request, an identifier of a user and an identifier of a terminal which has transmitted the service request;

authority decision means for deciding an authority over the service request based on the identifier of the user and the identifier of the terminal, acquired by said identifier acquisition means;

service determination means for determining whether or not to accept the service request by using the authority decided by said authority decision means; and reply transmission means for transmitting a reply to the terminal, which has transmitted the service request, in response to the service request by implementing the service request determined as accepted.

17. The server terminal according to claim 16, wherein, when the service request is received by using a process requiring a privilege, said service determination means makes a determination to accept the service request.

18. The server terminal according to claim 17, wherein the process requiring the privilege is a communication using a port number which cannot be used without the privilege.

19. The server terminal according to claim 18, wherein the process requiring the privilege is a communication using a predetermined port number.

20. A terminal capable of simultaneously operating a plurality of client softwares which transmit respective service requests to a server terminal, wherein the server terminal acquires a user identifier and a terminal identifier from a connection request, determines whether or not to accept the connection request based on the acquired user identifier and the acquired terminal identifier, decides an authority of the terminal over the service request based on the acquired user identifier and the acquired terminal identifier if the connection request is accepted, determines whether or not to accept the service request while the connection is established, by using the decided authority, and transmits a reply to the terminal in response to the service request by implementing the service request determined as accepted, said terminal comprising:

relay means for relaying a connection request and a service request from each of the client softwares to the server terminal, said relay means comprising:

user identifier acquisition means for acquiring an identifier of each user who uses a client software transmitting the service request, when the connection request is transmitted to a server terminal;

identifier addition means for adding a user identifier, acquired by said user identifier acquisition means, and a terminal identifier, held by said relay means, to the connection request;

connection request transmission means for transmitting the connection request to the server terminal;

service request transmission means for transmitting the service request after establishing the connection;

reply reception means for receiving a reply from the server terminal; and distribution means for distributing the received reply to each of the client softwares which have transmitted the service request.

21. The terminal according to claim 20, said relay means further comprising transmission determination means for determining whether or not to transmit the connection request to said server terminal based on the user identifier acquired by said user identifier acquisition means and the connection request.

22. The terminal according to claim 20, wherein said relay means can transmit a connection request to be relayed by using a process requiring a privilege.

23. The terminal according to claim 22, wherein the process requiring the privilege is a communication using a port number which cannot be used without the privilege.

24. The terminal according to claim 23, wherein the process requiring the privilege is a communication using a predetermined port number.

25. A server terminal providing a service to a terminal capable of simultaneously operating a plurality of client softwares which transmit respective service requests, the terminal have relay means which acquires an identifier of each user using the client software transmitting the service request, adds the acquired user identifier and a terminal identifier held by said relay means to a connection request, transmits the connection request to the server terminal, and transmits a service request to the server terminal after establishing the connection, the server terminal, comprising:

reception means for receiving the connection request and the service request;

identifier acquisition means for acquiring, from the received connection request, an identifier of a user and an identifier of a terminal which has transmitted the connection request;

connection determination means for determining whether or not to accept the connection request based on the identifier of the user and the identifier of the terminal acquired by said identifier acquisition means;

authority decision means for deciding an authority over the service request based on the identifier of the user and the identifier of the terminal acquired by said identifier acquisition means, if said connection determination means makes a determination to accept the connection request;

service determination means for determining whether or not to accept the service request while the connection is established, by using the authority decided by said authority decision means; and reply transmission means for transmitting a reply to the terminal, which has transmitted the connection request, in response to the service request by implementing the service request determined as accepted.

26. The terminal according to claim 25, wherein when the connection request is received by using a process requiring a privilege, said connection determination means makes a determination to accept the connection request.

27. The terminal according to claim 26, wherein the process requiring the privilege is a communication using a port number which cannot be used without the privilege.

28. The terminal according to claim 27, wherein the process requiring the privilege is a communication using a predetermined port number.

29. An authority control method of controlling an authority control system where a server terminal controls an authority of a terminal capable of simultaneously operating a plurality of client softwares which transmit respective service requests, said terminal comprising relay means for relaying a service request from each of the client softwares to the server terminal, said authority control method comprising operations of said relay means and said server terminal, said operation of said relay means comprising:

a user identifier acquisition step of acquiring an identifier of each user who uses a client software transmitting the service request;

an identifier addition step of adding a user identifier, acquired in said user identifier acquisition step, and a terminal identifier, held by said relay means, to the service request;

a transmission step of transmitting the service request to the server terminal;

a reply reception step of receiving a reply from the server terminal; and a distribution step of distributing the received reply to each of the client softwares which have transmitted the service request, and said operation of said server terminal comprising:

a reception step of receiving the service request;

an identifier acquisition step of acquiring the user identifier and the terminal identifier from the received service request;

an authority decision step of deciding an authority over the service request based on the user identifier and the terminal identifier acquired in said identifier acquisition step;

a service determination step of determining whether or not to accept the service request by using the authority decided in said authority decision step; and a reply transmission step of transmitting a reply to said relay means in response to the service request by implementing the service request determined as accepted.

30. The authority control method according to claim 29, said operation of said relay means further comprising a transmission determination step of determining whether or not to transmit the service request to said server terminal based on the user identifier acquired in said user identifier acquisition step and the service request.

31. The authority control method according to claim 29, wherein when the service request is transmitted in said transmission step by using a process requiring a privilege, it is determined to accept the service request in said service determination step.

32. The authority control method according to claim 31, wherein the process requiring the privilege is a communication using a port number which cannot be used without the privilege.

33. The authority control method according to claim 32, wherein the process requiring the privilege is a communication using a predetermined port number.

34. An authority control method of controlling an authority control system where a server terminal controls an authority of a terminal capable of simultaneously operating a plurality of client softwares which transmit respective service requests, said terminal, capable of operating the client softwares, comprising relay means for relaying a connection request and a service request from each of the client softwares, said authority control method comprising operations of said relay means and said server terminal, said operation of said relay means comprising:

a user identifier acquisition step of acquiring an identifier of each user, who uses a client software transmitting the service request, when the connection request is transmitted to the server terminal;

an identifier addition step of adding a user identifier, acquired in said user identifier acquisition step, and a terminal identifier, held by said relay means, to the connection request;

a connection request transmission step of transmitting the connection request to the server terminal;

a service request transmission step of transmitting the service request after establishing the connection;

a reply reception step of receiving a reply from the server terminal; and a distribution step of distributing the received reply to each of the client softwares which have transmitted the service request, and said operation of said server terminal comprising:

a reception step of receiving the connection request and the service request;

an identifier acquisition step of acquiring the user identifier and the terminal identifier from the received connection request;

a connection determination step of determining whether or not to accept the connection request based on the user identifier and the terminal identifier acquired in said identifier acquisition step;

an authority decision step of deciding an authority over the service request based on the user identifier and the terminal identifier acquired in said identifier acquisition step, if determination is made to accept the connection request;

a service determination step of determining whether or not to accept the service request while the connection is established, by using the authority decided in said authority decision step; and a reply transmission step of transmitting a reply to said relay means in response to the service request by implementing the service request determined as accepted.

35. The authority control method according to claim 34, said operation of said relay means further comprising a transmission determination step of determining whether or not to transmit the connection request to said server terminal based on the user identifier acquired in said user identifier acquisition step and the connection request.

36. The authority control method according to claim 34, wherein when the connection request is transmitted in said connection request transmission step by using a process requiring a privilege, it is determined to accept the connection request in said connection determination step.

37. The authority control method according to claim 36, wherein the process requiring the privilege is a communication using a port number which cannot be used without the privilege.

38. The authority control method according to claim 37, wherein the process requiring the privilege is a communication using a predetermined port number.

39. A terminal control method of controlling a terminal capable of simultaneously operating a plurality of client softwares which transmit respective service requests to a server terminal, wherein the server terminal decides an authority of the terminal over the service request based on a user identifier and a terminal identifier, determines whether or not to accept the service request by using the decided authority, and transmits a reply to the terminal in response to the service request by implementing the service request determined as accepted, said terminal comprising relay means for relaying a service request from each of the client softwares to the server terminal, said terminal control method comprising operation of said relay means, said operation of said relay means comprising:

a user identifier acquisition step of acquiring an identifier of each user who uses a client software transmitting the service request;

an identifier addition step of adding a user identifier, acquired in said user identifier acquisition step, and a terminal identifier, held by said relay means, to the service request;

a transmission step of transmitting the service request to the server terminal;

reply reception step of receiving the reply from the server terminal; and a distribution step of distributing the received reply to each of the client softwares which have transmitted the service request.

40. The terminal control method according to claim 39, said operation of said relay means further comprising a transmission determination step of determining whether or not to transmit the service request to said server terminal based on the user identifier acquired in said user identifier acquisition step and the service request.

41. The terminal control method according to claim 39, wherein the service request can be transmitted in said transmission step by using a process requiring a privilege.

42. The terminal control method according to claim 41, wherein the process requiring the privilege in said transmission step is a communication using a port number which cannot be used without the privilege.

43. The terminal control method according to claim 42, wherein the process requiring the privilege is a communication using a predetermined port number.

44. A terminal control method of controlling a server terminal providing a service to a terminal capable of simultaneously operating a plurality of client softwares which transmit respective service requests, the terminal having relay means which acquires an identifier of each user using the client software transmitting the service request, adds the acquired user identifier and a terminal identifier held by said relay means to the service request and transmits the service request to the server terminal, the server terminal control method, comprising the steps of:

a reception step of receiving a service request;

an identifier acquisition step of acquiring, from the received service request, an identifier of a user and an identifier of a terminal which has transmitted the service request;

an authority decision step of deciding an authority over the service request based on the identifier of the user and the identifier of the terminal acquired in said identifier acquisition step;

a service determination step of determining whether or not to accept the service request by using the authority decided in said authority decision step; and a reply transmission step of transmitting a reply to the terminal, which has transmitted the service request, in response to the service request by implementing the service request determined as accepted.

45. The terminal control method according to claim 44, wherein when the service request is received by using a process requiring a privilege, it is determined to accept the service request in said service determination step.

46. The terminal control method according to claim 45, wherein the process requiring the privilege is a communication using a port number which cannot be used without the privilege.

47. The terminal control method according to claim 46, wherein the process requiring the privilege is a communication using a predetermined port number.

48. A terminal control method of controlling a terminal capable of simultaneously operating a plurality of client softwares which transmit respective service requests to a server terminal, wherein the server terminal acquires a user identifier and a terminal identifier from a connection request, determines whether or not to accept the connect ion request based on the acquired user identifier and the acquired terminal identifier, decides an authority of the terminal over the service request based on the acquired user identifier and the acquired terminal identifier if the connection request is accepted, determines whether or not to accept the service request while the connection is established, by using the decided authority, and transmits a reply to the terminal in response to the service request by implementing the service request determined as accepted, said terminal comprising relay means for relaying a connection request and a service request from each of the client softwares to the server terminal, said terminal control method comprising operation of said relay means, said operation of said relay means comprising:
a user identifier acquisition step of acquiring an identifier of each user who uses a client software transmitting the service request, when the connection request is transmitted to a server terminal;
an identifier addition step of adding a user identifier, acquired in said user identifier acquisition step, and a terminal identifier, held by said relay means, to the connection request;
a connection request transmission step of transmitting the connection request to the server terminal;
a service request transmission step of transmitting the service request after establishing a connection;
a reply reception step of receiving a reply from the server terminal; and
a distribution step of distributing the received reply to each of the client softwares which have transmitted the service request.

49. The terminal control method according to claim 48, said operation of said relay means further comprising a transmission determination step of determining whether or not to transmit the connection request to said server terminal based on the user identifier acquired in said user identifier acquisition step and the connection request.

50. The terminal control method according to claim 48, wherein the connection request can be transmitted in said connection request transmission step by using a process requiring a privilege.

51. The terminal control method according to claim 50, wherein the process requiring the privilege is a communication using a port number which cannot be used without the privilege.

52. The terminal control method according to claim 51, wherein the process requiring the privilege is a communication using a predetermined port number.

53. A terminal control method of a server terminal providing a service to a terminal capable of simultaneously operating a plurality of client softwares which transmit respective service requests, the terminal having relay means which acquires an identifier of each user using the client software transmitting the service request, adds the acquired user identifier and a terminal identifier held by said relay means to a connection request, transmits the connection request to the server terminal, and transmits a service request to the server terminal after establishing the connection, the server terminal control method, comprising the steps of:

a reception step of receiving the connection request and the service request;
an identifier acquisition step of acquiring, from the received connection request, an identifier of a user and an identifier of a terminal which has transmitted the connection request;
a connection determination step of determining whether or not to accept the connection request based on the identifier of the user and the identifier of the terminal acquired in said identifier acquisition step;
an authority decision step of deciding an authority over the service request based on the identifier of the user and the identifier of the terminal acquired in said identifier acquisition step, if determination is made to accept the connection request;
a service determination step of determining whether or not to accept the service request while the connection is established, by using the authority decided in said authority decision step; and
a reply transmission step of transmitting a reply to the terminal, which has transmitted the connection request, in response to the service request by implementing the service request determined as accepted.

54. The terminal control method according to claim 53, wherein when the connection request is received by using a process requiring a privilege, it is determined to accept the connection request in said connection determination step.

55. The terminal control method according to claim 54, wherein the process requiring the privilege is a communication using a port number which cannot be used without the privilege.

56. The terminal control method according to claim 55, wherein the process requiring the privilege is a communication using a predetermined port number.

57. A storage medium storing a computer-readable authority control program for controlling an authority control system where a server terminal controls an authority of a terminal capable of simultaneously operating a plurality of client softwares which transmit respective service requests, said terminal comprising relay means for relaying a service request from each of the client softwares to the server terminal, said computer-readable authority control program comprising operation programs of said relay means and said server terminal, said operation program of said relay means comprising:
a user identifier acquisition step of acquiring an identifier of each user who uses a client software transmitting the service request;
an identifier addition step of adding a user identifier, acquired in said user identifier acquisition step, and a terminal identifier, held by said relay means, to the service request;
a transmission step of transmitting the service request to the server terminal;
a reply reception step of receiving a reply from the server terminal; and a distribution step of distributing the received reply to each of the client softwares which have transmitted the service request, and said operation program of said server terminal comprising:
- a reception step of receiving the service request;
- an identifier acquisition step of acquiring the user identifier and the terminal identifier from the received service request;
- an authority decision step of deciding an authority over the service request based on the user identifier and the terminal identifier acquired in said identifier acquisition step;
- a service determination step of determining whether or not to accept the service request by using the authority decided in said authority decision step; and
- a reply transmission step of transmitting a reply to said relay means in response to the service request by implementing the service request determined as accepted.

58. The storage medium storing the computer-readable authority control program according to claim 57, said operation program of said relay means further comprising a transmission determination step of determining whether or not to transmit the service request to said server terminal based on the user identifier acquired in said user identifier acquisition step and the service request.

59. The storage medium storing the computer-readable authority control program according to claim 57, wherein when the service request is transmitted in said transmission step by using a process requiring a privilege, it is determined to accept the service request in said service determination step.

60. The storage medium storing the computer-readable authority control program according to claim 59, wherein the process requiring the privilege is a communication using a port number which cannot be used without the privilege.

61. The storage medium storing the computer-readable authority control program according to claim 60, wherein the process requiring the privilege is a communication using a predetermined port number.

62. A storage medium storing a computer-readable authority control program for controlling an authority control system in which a server terminal controls an authority of a terminal capable of simultaneously operating a plurality of client softwares which transmit respective service requests, said terminal comprising relay means for relaying a connection request and a service request from each of the client softwares, said computer-readable authority control program comprising operation programs of said relay means and said server terminal, said operation program of said relay means comprising:
- a user identifier acquisition step of acquiring an identifier of each user who uses a client software transmitting the service request, when the connection request is transmitted to the server terminal;
- an identifier addition step of adding a user identifier, acquired in said user identifier acquisition step, and a terminal identifier, held by said relay means, to the connection request;
- a connection request transmission step of transmitting the connection request to the server terminal;
- a service request transmission step of transmitting the service request after establishing the connection;
- a reply reception step of receiving a reply from the server terminal; and
- a distribution step of distributing the received reply to each of the client softwares which have transmitted the service request, and said operation program of said server terminal comprising:
- a reception step of receiving the connection request and the service request;
- an identifier acquisition step of acquiring the user identifier and the terminal identifier from the received connection request;
- a connection determination step of determining whether or not to accept the connection request based on the user identifier and the terminal identifier acquired in said identifier acquisition step;
- an authority decision step of deciding an authority over the service request based on the user identifier and the terminal identifier acquired in said identifier acquisition step, if determination is made to accept the connection request;
- a service determination step of determining whether or not to accept the service request while the connection is established, by using the authority decided in said authority decision step; and
- a reply transmission step of transmitting a reply to said relay means in response to the service request by implementing the service request determined as accepted.

63. The storage medium storing the computer-readable authority control program according to claim 62, said operation program of said relay means further comprising a transmission determination step of determining whether or not to transmit the connection request to said server terminal based on the user identifier acquired in said user identifier acquisition step and the connection request.

64. The storage medium storing the computer-readable authority control program according to claim 62, wherein when the connection request is transmitted in said connection request transmission step by using a process requiring a privilege, it is determined to accept the connection request in said connection determination step.

65. The storage medium storing the computer-readable authority control program according to claim 64, wherein the process requiring the privilege is a communication using a port number which cannot be used without the privilege.

66. The storage medium storing the computer-readable authority control program according to claim 65, wherein the process requiring the privilege is a communication using a predetermined port number.

67. A storage medium storing a computer-readable terminal control program for controlling a terminal capable of simultaneously operating a plurality of client softwares which transmit respective service requests to a server terminal wherein, the server terminal decides an authority of the terminal over the service request based on a user identifier and a terminal identifier, determines whether or not to accept the service request by using the decided authority, and transmits a reply to the terminal in response to the service request by implementing the service request determined as accepted, said terminal comprising relay means for relaying a service request from each of the client softwares to the server terminal, said computer-readable terminal control program comprising an operation program of said relay means, said operation program of said relay means comprising:
- a user identifier acquisition step of acquiring an identifier of each user who uses a client software transmitting the service request;

an identifier addition step of adding a user identifier, acquired in said user identifier acquisition step, and a terminal identifier, held by said relay means, to the service request;

a transmission step of transmitting the service request to the server terminal;

a reply reception step of receiving the reply from the server terminal; and a distribution step of distributing the received reply to each of the client softwares which have transmitted the service request.

68. The storage medium storing the computer-readable terminal control program according to claim 67, said operation program of said relay means further comprising a transmission determination step of determining whether or not to transmit the service request to said server terminal based on the user identifier acquired in said user identifier a acquisition step and the service request.

69. The storage medium storing the computer-readable terminal control program according to claim 67, wherein the service request can be transmitted in said transmission step by using a process requiring a privilege.

70. The storage medium storing the computer-readable terminal control program according to claim 69, wherein the process requiring the privilege in said transmission step is a communication using a port number which cannot be used without the privilege.

71. The storage medium storing the computer-readable terminal control program according to claim 70, wherein the process requiring the privilege is a communication using a predetermined port number.

72. A storage medium storing a computer-readable terminal control program for controlling a server terminal providing a service to a terminal capable of simultaneously operating a plurality of client softwares which transmit respective service requests, the terminal having relay means which acquires an identifier of each user using the client software transmitting the service request, adds the acquired user identifier and a terminal identifier held by said relay means to the service request, and transmits the service request to the server terminal, the server terminal control program, comprising the steps of:

a reception step of receiving a service request;

an identifier acquisition step of acquiring, from the received service request, an identifier of a user and an identifier of a terminal which has transmitted the service request;

an authority decision step of deciding an authority over the service request based on the identifier of the user and the identifier of the terminal, acquired in said identifier acquisition step;

a service determination step of determining whether or not to accept the service request by using the authority decided in said authority decision step; and a reply transmission step of transmitting a reply to the terminal, which has transmitted the service request, in response to the service request by implementing the service request determined as accepted.

73. The storage medium storing the computer-readable terminal control program according to claim 72, wherein when the service request is received by using a process requiring a privilege, it is determined to accept the service request in said service determination step.

74. The storage medium storing the computer-readable terminal control program according to claim 72, wherein the process requiring the privilege is a communication using a port number which cannot be used without the privilege.

75. The storage medium storing the computer-readable terminal control program according to claim 74, wherein the process requiring the privilege is a communication using a predetermined port number.

76. A storage medium storing a computer-readable terminal control program for controlling a terminal capable of simultaneously operating a plurality of client softwares which transmit respective service requests to a server terminal, wherein the server terminal acquires a user identifier and a terminal identifier from a connection request, determines whether or not to accept the connection request based on the acquired user identifier and the acquired terminal identifier, decides an authority of the terminal over the service request based on the acquired user identifier and the acquired terminal identifier if the connection request is accepted, determines whether or not to accept the service request while the connection is established, by using the decided authority, and transmits a reply to the terminal in response to the service request by implementing the service request determined as accepted, said terminal comprising relay means for relaying a connection request and a service request from each of the client softwares to the server terminal, said computer-readable terminal control program comprising an operation program of said relay means, said operation program of said relay means comprising:

a user identifier acquisition step of acquiring an identifier of each user, who uses a client software transmitting the service request, when the connection request is transmitted to a server terminal;

an identifier addition step of adding a user identifier, acquired in said user identifier acquisition step, and a terminal identifier, held by said relay means, to the connection request;

a connection request transmission step of transmitting the connection request to the server terminal;

a service request transmission step of transmitting the service request after establishing a connection;

a reply reception step of receiving a reply from the server terminal; and a distribution step of distributing the received reply to each of the client softwares which have transmitted the service request.

77. The storage medium storing the computer-readable terminal control program according to claim 76, said operation program of said relay means further comprising a transmission determination step of determining whether or not to transmit the connection request to said server terminal based on the user identifier acquired in said user identifier acquisition step and the connection request.

78. The storage medium storing the computer-readable terminal control program according to claim 76, wherein the connection request can be transmitted in said connection request transmission step by using a process requiring a privilege.

79. The storage medium storing the computer-readable terminal control program according to claim 78, wherein the process requiring the privilege is a communication using a port number which cannot be used without the privilege.

80. The storage medium storing the computer-readable terminal control program according to claim 79, wherein the process requiring the privilege is a communication using a predetermined port number.

81. A storage medium storing a computer-readable terminal control program for controlling a server terminal providing a service to a terminal capable of simultaneously operating a plurality of client softwares which transmit respective service requests, the terminal having relay means which acquires an identifier of each user using the client software transmitting the service request, adds the acquired user identifier and a terminal identifier held by said relay means to a connection request, transmits the connection request to the server terminal, and transmits a service request to the server terminal after establishing the connection, the server terminal control program, comprising the step of:

- a reception step of receiving the connection request and the service request;
- an identifier acquisition step of acquiring, from the received connection request, an identifier of a user and an identifier of a terminal which has transmitted the connection request;
- a connection determination step of determining whether or not to accept the connection request based on the identifier of the user and the identifier of the terminal, acquired in said identifier acquisition step;
- an authority decision step of deciding an authority over the service request based on the identifier of the user and the identifier of the terminal, acquired in said identifier acquisition step, if determination is made to accept the connection request;
- a service determination step of determining whether or not to accept the service request while the connection is established, by using the authority decided in said authority decision step; and
- a reply transmission step of transmitting a reply to the terminal, which has transmitted the connection request, in response to the service request by implementing the service request determined as accepted.

82. The storage medium storing the computer-readable terminal control program according to claim 81, wherein when the connection request is received by using a process requiring a privilege, it is determined to accept the connection request in said connection determination step.

83. The storage medium storing the computer-readable terminal control program according to claim 82, wherein the process requiring the privilege is a communication using a port number which cannot be used without the privilege.

84. The storage medium storing the computer-readable terminal control program according to claim 83, wherein the process requiring the privilege is a communication using a predetermined port number.

* * * * *

UNITED STATES PATENT AND TRADEMARK OFFICE
CERTIFICATE OF CORRECTION

PATENT NO. : 6,237,023 B1
DATED : May 22, 2001
INVENTOR(S) : Yoshimoto

It is certified that error appears in the above-identified patent and that said Letters Patent is hereby corrected as shown below:

Column 2,
Line 1, "terminal-which" should read -- terminal which --; and
Line 47, "is" should read -- as --.

Column 4,
Line 4, "etc." should read -- etc., --;
Line 14, "Theuser" should read -- The user --;
Line 20, "e.g." should read -- e.g., --;
Line 21, "FRC1413" should read -- RFC1413 --;
Line 27, "(e.g." should read -- (e.g., --;
Line 29, "(e.g." should read -- )e.g., --; and
Line 52, "m⊃r" should read -- m⊇r --.

Column 5,
Line 59, "making" should read -- using --.

Column 9,
Line 46, "to," should read -- to --.

Column 12,
Line 11, "terminal," should read -- terminal --.

Column 13,
Line 26, "have" should read -- having --; and
Line 32, "terminal," should read -- terminal --.

Column 16,
Line 20, "reply" (first occurrence) should read -- a reply --; and
Line 50, "method," should read -- method --.

Column 17,
Line 16, "connect ion" should read -- connection --.

Column 18,
Line 9, "method," should read -- method --.

UNITED STATES PATENT AND TRADEMARK OFFICE
CERTIFICATE OF CORRECTION

PATENT NO. : 6,237,023 B1
DATED : May 22, 2001
INVENTOR(S) : Yoshimoto

It is certified that error appears in the above-identified patent and that said Letters Patent is hereby corrected as shown below:

Column 21,
Line 41, "program," should read -- program --.

Column 22,
Line 30, "a" should read -- the --.

Column 23,
Line 8, "program," should read -- program --.

Signed and Sealed this

Eighteenth Day of June, 2002

Attest:

JAMES E. ROGAN
Attesting Officer     Director of the United States Patent and Trademark Office